(12) United States Patent
Kamemizu et al.

(10) Patent No.: US 6,428,075 B2
(45) Date of Patent: Aug. 6, 2002

(54) ARTICLE STORING STRUCTURE FOR SCOOTER TYPE VEHICLE

(75) Inventors: Fuminori Kamemizu; Seiichi Tateishi, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/805,159

(22) Filed: Mar. 14, 2001

(30) Foreign Application Priority Data

Mar. 14, 2000 (JP) ........................................ 2000-070894

(51) Int. Cl.[7] ............................ B60R 5/00; E05B 13/00; B62J 9/00
(52) U.S. Cl. .............. 296/37.1; 292/210; 292/DIG. 23; 70/224; 70/416
(58) Field of Search ............................ 292/108, 210, 292/128, 99, 228, 203, DIG. 23; 70/416, 208, 224; 296/37.1, 37.8, 37.12, 37.13, 72

(56) References Cited

U.S. PATENT DOCUMENTS 4,364,249 A  * 12/1982  Kleefeldt .................. 292/144
5,295,374 A  *  3/1994  Bender et al. .............. 292/201
6,148,651 A  * 11/2000  Roncin ...................... 292/201
6,164,711 A  * 12/2000  Neal et al. ................. 292/123
6,290,268 B1 *  9/2001  Cohen et al. ............... 292/196

FOREIGN PATENT DOCUMENTS

JP        A11208551           8/1999

* cited by examiner

*Primary Examiner*—Joseph D. Pape
*Assistant Examiner*—Patricia Engle
(74) *Attorney, Agent, or Firm*—Birch, Stewart, Kolasch & Birch, LLP (57) ABSTRACT

A lock for a large-sized lid in a shape of flat plate includes a one piece lock mechanism. In an article storing compartment for a scooter type vehicle, an article storing chamber is provided at an inner cover. An opening of the article storing chamber is covered with an openable/closable lid. The lid is fastened to the inner cover by means of a swingable first claw. The first claw is locked by a lock mechanism and the first claw is capable of being unlatched by a manually operable swing knob attached to the first claw. The lock mechanism is provided in a position remote from the first claw. The lid may be fastened to the inner cover by a second claw extending from a key cylinder of the lock mechanism.

20 Claims, 7 Drawing Sheets

ARTICLE STORING STRUCTURE FOR SCOOTER TYPE VEHICLE

BACKGROUND OF THE INVENTION

1. Field of the Invention

The present invention relates. to an article storing structure for a scooter type

2. Description of Background Art

A scooter type vehicle such as a motorcycle includes a cover for the vehicle body and an article storing chamber in one section of the vehicle body cover. The article storing chamber includes an openable/closable lid that is provided with a key type lock mechanism to the lid for closing the article storing chamber. The lid can be locked by swinging a lock claw with a key inserted into a key hole of the lock mechanism and by fastening the lock claw to the vehicle body cover.

Two types of systems are available for locking the lid by means of the key. A system for opening the lid while holding the key as well as for locking the lid with the key and a system for combining the key to lock the lid with a swing knob manually operated in order to open the lid. Either of the systems provides a method to lock the lid by swinging one piece of the locking claw with the key and by fastening the locking claw to a vehicle body cover.

An example of the first system is disclosed, for instance, in Japanese Unexamined Patent Publication H 11-208551 entitled "Article Storing Device for Scooter Type Vehicle."

In this Japanese publication, according to FIG. 2 and FIG. 6, a second article storing chamber 24 is provided in a leg shield 21 of a vehicle body cover 12, an opening of the second article storing chamber 24 is constituted so as to be covered with an openable/closable lid 25. The lid 25 can be locked by means of a lock device, not illustrated, mounted on a lock device embedding recessed section 39 of the lid 25.

By the way, in the above-identified systems, the lid is made to be large-sized in association with an increase in capacity of the article storing chamber or the lid is made in a shape of flat plate in terms of designing a vehicle body cover. Even in these cases, it is preferable that the lid is capable of being securely locked without increasing the rigidity of the lid.

However, in the above-identified systems, the lid is locked by fastening one piece of lock claw on the lid side to the vehicle body cover, and there is a limit in locking the lid by securely utilizing only one piece of a lock claw without increasing the rigidity of the lid. With regard to these aspects, it is considered that a plurality of lock mechanisms may be provided in the lid. However, this is not a wise practice, since a lock operation may become troublesome and the number of component items is increased.

SUMMARY AND OBJECTS OF THE INVENTION

An object of the present invention is to provide a locking mechanism for a lid having a large size and in a shape of flat plate by one piece of a locking mechanism in a simple operation.

In order to achieve the object described above, a first aspect of the invention is characterized in an article storing structure for a scooter type vehicle, wherein an article storing chamber is provided at a vehicle body cover for a scooter type vehicle, an opening of the article storing chamber is covered with an openable/closable lid, the lid is fastened to the vehicle body cover by a swingable first claw, the first claw is locked by a lock mechanism, and the first claw is capable of being unlatched by means of a manually operable swing knob provided with the first claw, wherein the lock mechanism is provided at a remote position from the first claw, and the lid is fastened to a vehicle body cover even by a second claw extending from a key cylinder of the lock mechanism.

The lid can simultaneously be locked by two pieces of claws, having a first claw and a second claw resides in a position remote from the first claw by a key-operating one piece of a lock mechanism.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the present Invention will be explained on the basis of the attached drawings. The terms "front," "rear," "left," "right," "above," and "below" are followed in the direction as viewed from the driver, symbol Fr denotes a front side, symbol Rr denotes a rear side, symbol L denotes a left side, and symbol R denotes a right side.

Figure 1:
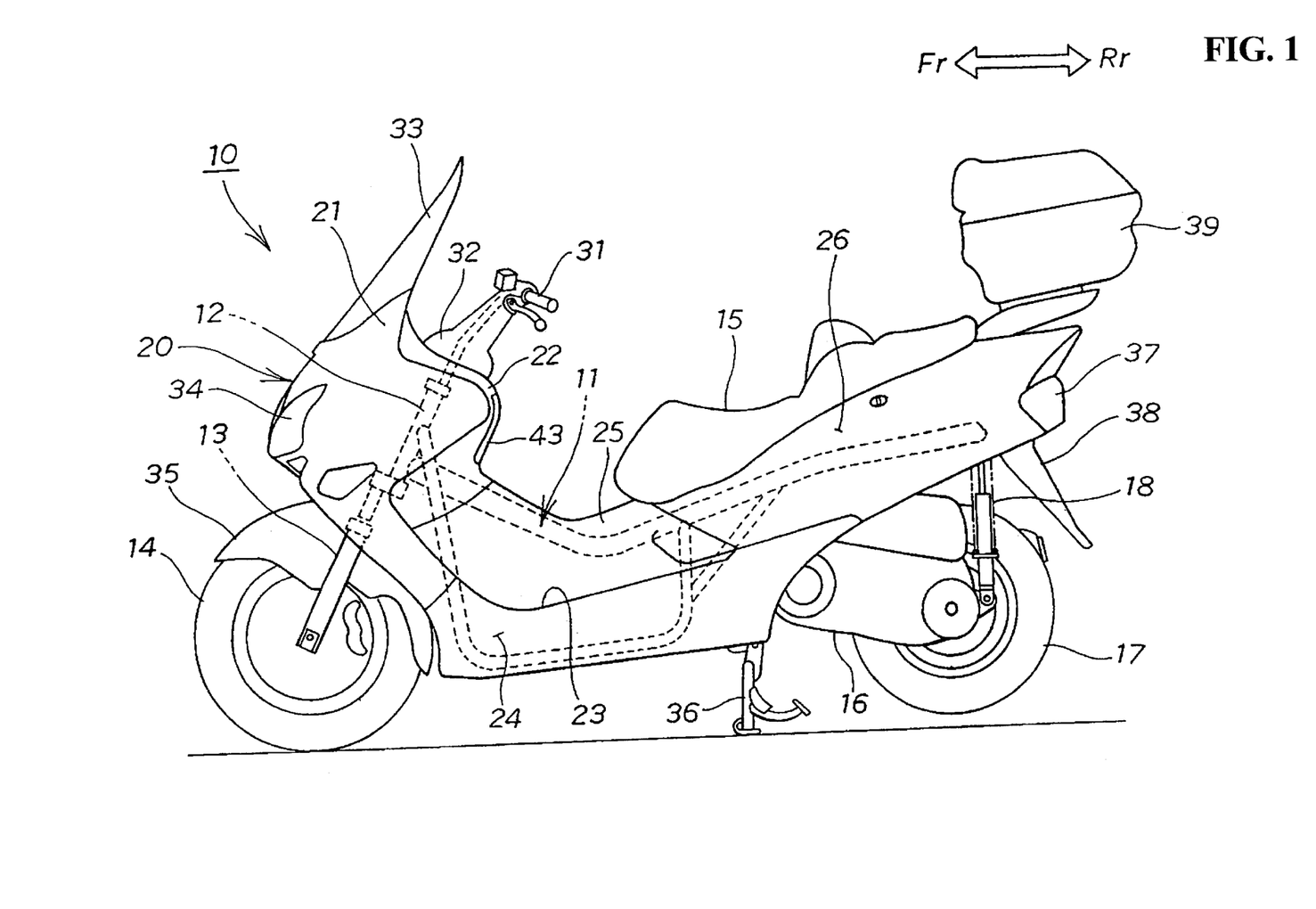
FIG. 1 shows a side elevational view illustrating a scooter type vehicle according to the present invention.

FIG. 1 shows a side elevation view illustrating a scooter type vehicle according to the present invention.

A scooter type vehicle 10 includes a vehicle frame 11, a front fork 13 and a front wheel 14 mounted steerably on a front section head pipe 12 of the vehicle body frame 11. An open/close type seat 15 covers an upper section of a luggage box, which is not illustrated, mounted on the rear section of the vehicle body frame 11. A power unit 16 is arranged downwardly of the seat 15. A rear wheel 17 is mounted on the rear section of the power unit 16. A rear shock absorber 18 is provided in which a rear end of the power unit 16 is suspended from the rear end of the vehicle body frame 11. A vehicle body cover 20 is provided for covering the vehicle body frame (vehicle body) 11.

The vehicle body cover 20 includes a front cover 21 for covering a front section of the head pipe 12 and an upper section of the front wheel 14, an inner cover 22 for covering a rear section of the front cover 21, a left/right floor steps 23 for resting the feet of the driver. In FIG. 1, only one side thereof is illustrated, a left/right floor skirts 24 extends downward from an outer edge of the floor step 23, the center cover 25 for covering the longitudinal center of the vehicle body frame 11 extends rearward from the inner cover 22. In addition, side covers 26 are provided for covering both side surfaces of the rear section of the vehicle body frame 11 and extend rearwardly from the center cover 25.

In FIG. 1, a handlebar 31, a handlebar cover 32, a wind screen 33, a head lamp 34, a front fender 35, a main stand 36, a tail lamp 37, a rear fender 38 and 39 denote a storing box 39 are provided.

Figure 2:
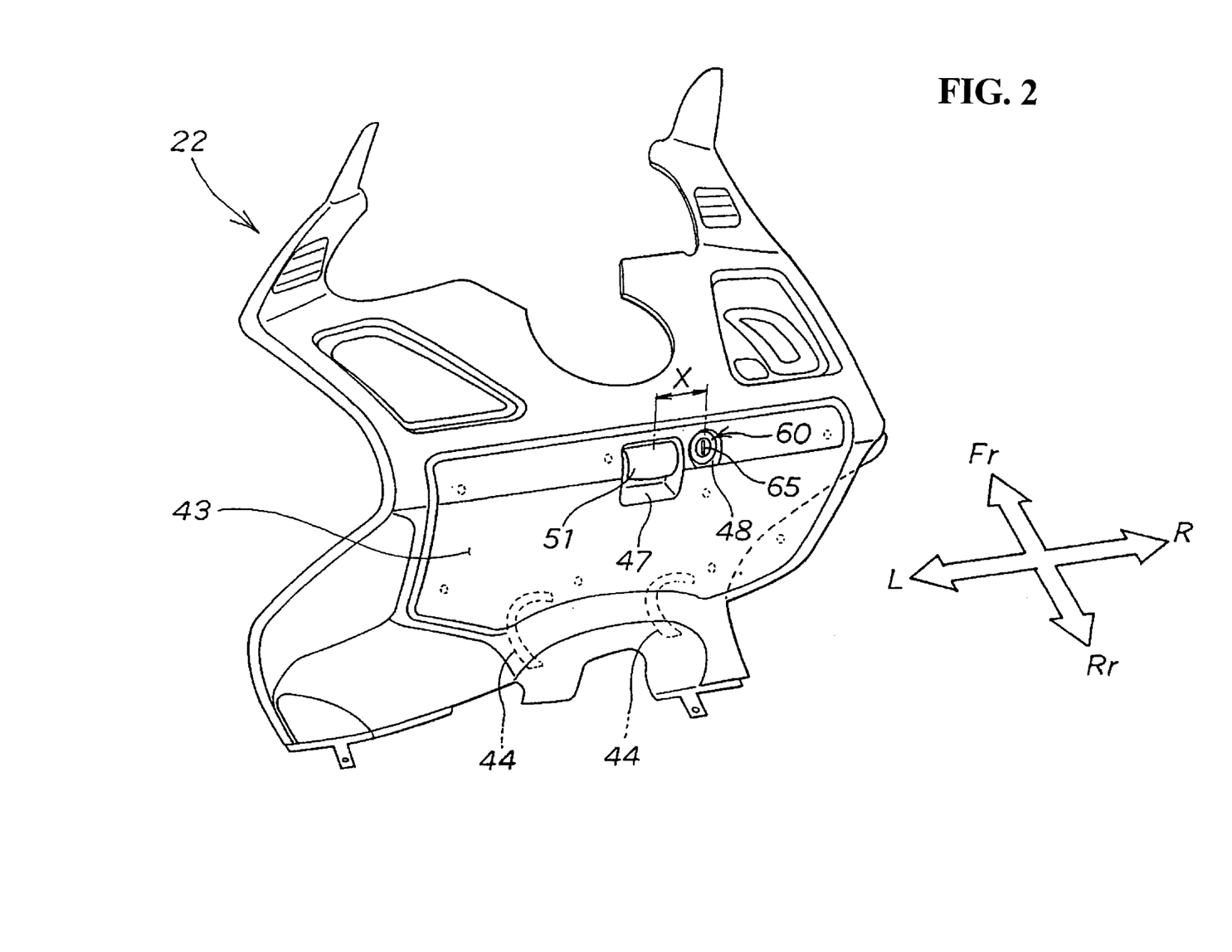
FIG. 2 shows a perspective view illustrating an inner cover according to the present invention.

FIG. 2 shows a perspective view illustrating an inner cover according to the present invention, and illustrating the inner cover viewed from a back face side.

An inner cover 22 is a vehicle body cover provided with a lid 43 for covering an opening of an article storing chamber, which will be described later. The lid 43 presents substantially in a flat plate shape conformed to a shape of the inner cover 22 and is a laterally long, comparatively large in size, and openable/closable member conformed to the opening of the article storing chamber. The lid 43 is mounted at the lower section thereof on the inner cover 22 via left and right hinges 44 and 44 and is provided with a swing knob 51 in the upper section center of a vehicle width. A lock mechanism 60 is positioned at a position remote from the swing knob 51 to the right or left by a prescribed distance X. A key hole 65 is provided for the lock mechanism 60.

Figure 3:
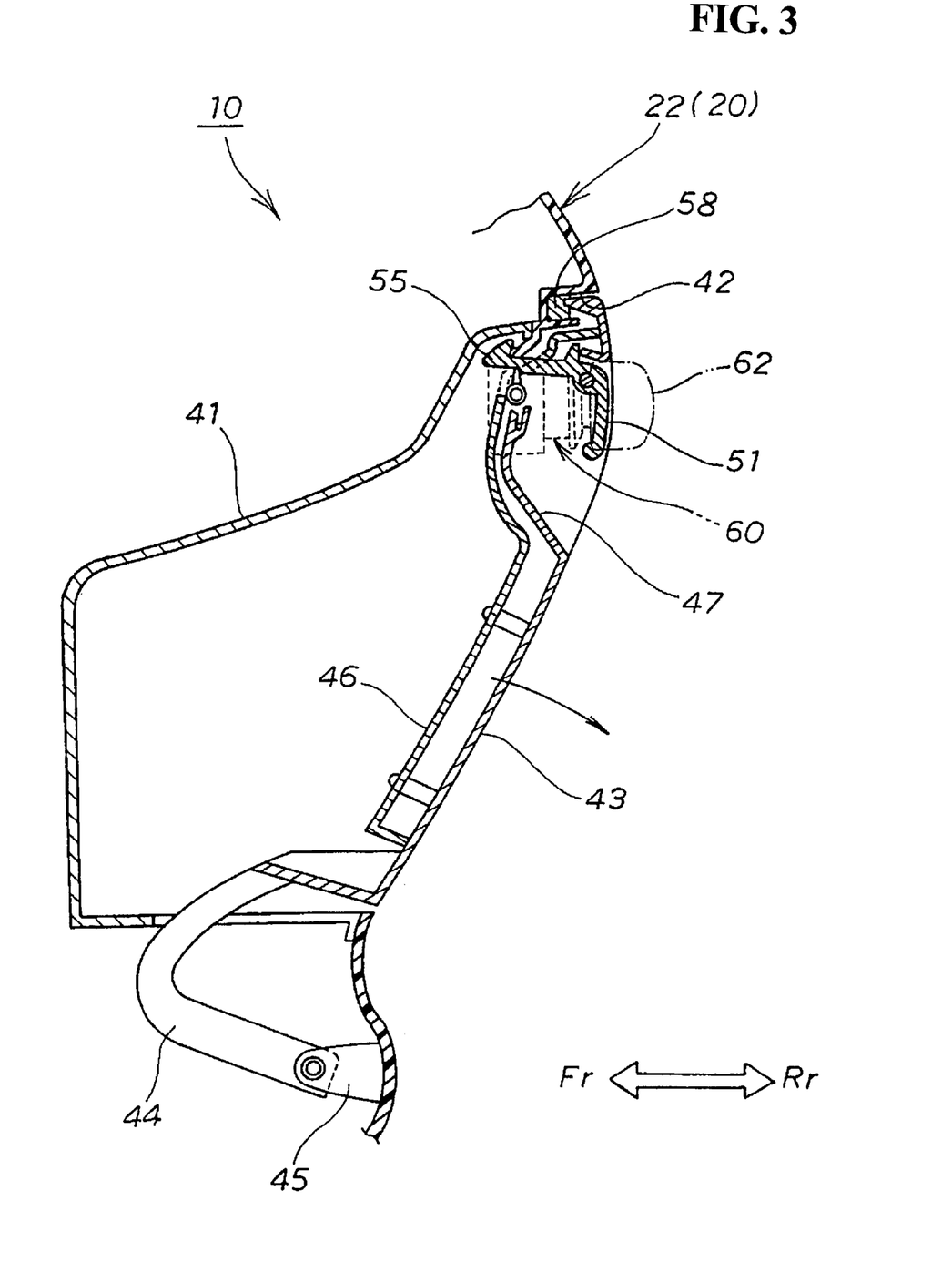
FIG. 3 shows a sectional view illustrating an inner cover, an article storing chamber, and a lid according to the present invention.

FIG. 3 shows a sectional view illustrating an inner cover, an article storing chamber, and a lid according to the present invention, and illustrating a longitudinally sectional structure in the center of a vehicle width.

An article storing chamber 41 includes an opening 42 thereof to a back face side. A resin made box is integrally provided with the front cover 21 (refer to FIG. 1) or the inner cover 22 out of the vehicle body cover 20. The chamber includes the opening 42 that is covered with the lid 43. The lid 43 includes a hinge 44 extending from a lower end section thereof. The lid 43 is mounted longitudinally and swingably on a hinge bracket 45 of the inner cover 22, an inner member 46 overlaps with an inner surface of the lid so as to be fixed by vis-fastening or the like. The inclusion of the inner member 46 may be optionally selected.

Figure 4:
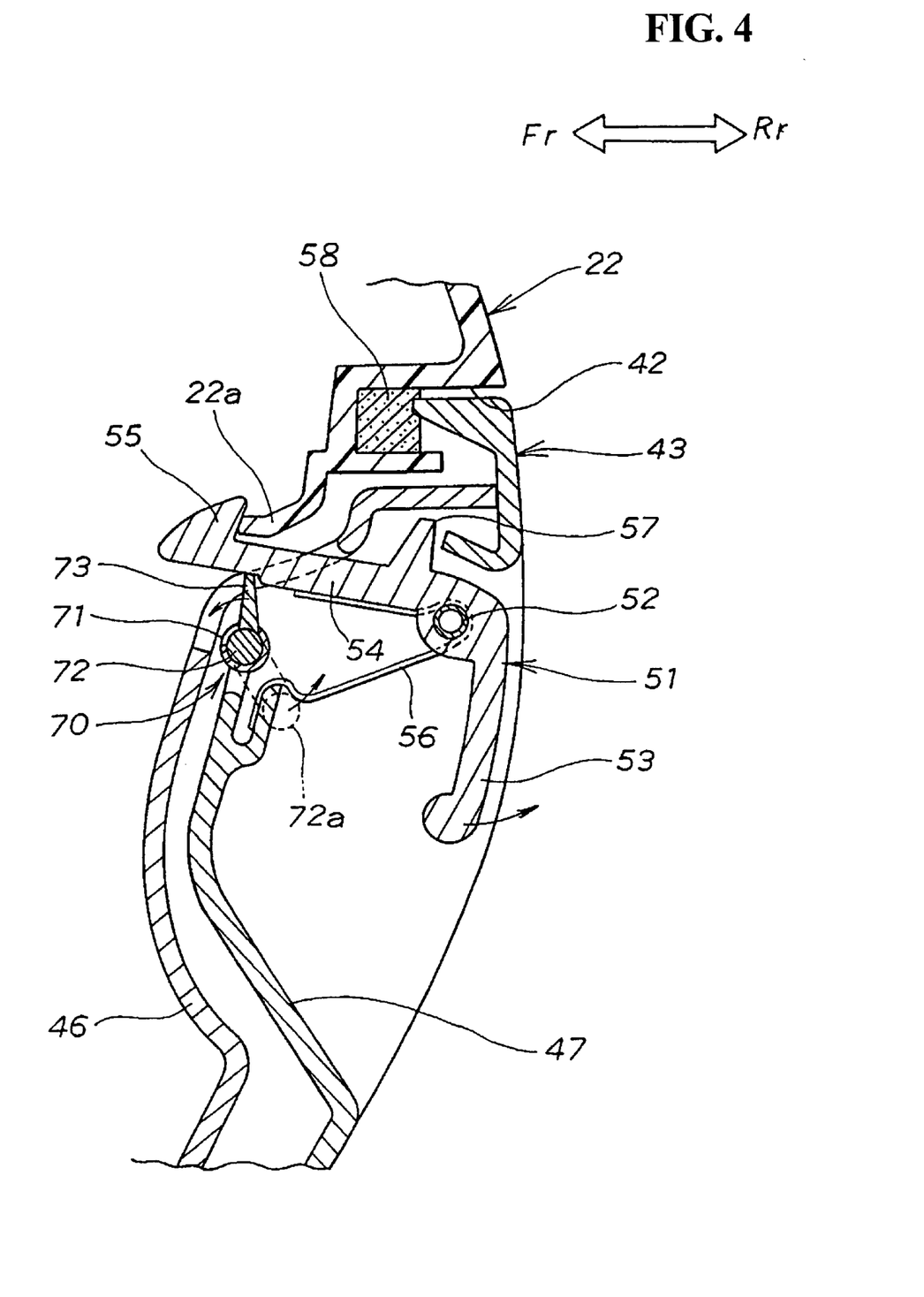
FIG. 4 shows a longitudinal sectional view illustrating around a lid and a swing knob according to the present invention.

FIG. 4 shows a longitudinally sectional view illustrating a lid and a swing knob according to the present invention. FIG. 4 illustrates that a knob mounting recessed section 47 is formed on an upper section of the lid 43. The swing knob 51 is longitudinally and swingably mounted on this knob mounting recessed section 47 by means of a support pin 52.

The swing knob 51 includes a finger hooking section 53 extending downwardly from a swing central section. A swingable first claw 54 extends frontwardly from the swing central section. A locking projection section 55 is positioned forwardly at a tip upper section of the first claw 54 and is a manually operable knob. The locking projection section 55 is capable of fastening to a locking piece 22a extending frontwardly from the inner cover 22.

A return spring 56 is interposed between the lid 43 and the first claw 54 in order to elastically repulse the swing knob 51 in a direction to fasten the locking projection 55 of the first claw 54 to the locking piece 22a. The return spring 56 is, for example, "a twist spring" or "a plate spring." More specifically, one end of the return spring 56 is hooked on one section of the lid 43 and the other end of the return spring 56 is hooked to a lower surface of the first claw 54. In FIG. 4 a stopper 57 and an opening section sealing packing 58 are provided.

The swing knob 51 is interlocked with the lock mechanism 60 (refer to FIG. 3) via a locking mechanism 70. The locking mechanism 70 is provided with a pin support section 71 integrally formed with the lid 43. Interlocking pin 72 is rotatably supported to the pin support section 71. A lock cam 73 is fixed to the interlocking pin 72. The lock cam 73 is a cam for fastening the locking projection section 55 to the locking piece 22a by pushing upwardly the lower surface of the first claw 54. To put it in other words, the first claw 54 can be pushed by the lock cam 73 in a direction to fasten the first claw 54 to the locking piece 22a.

Figure 5:
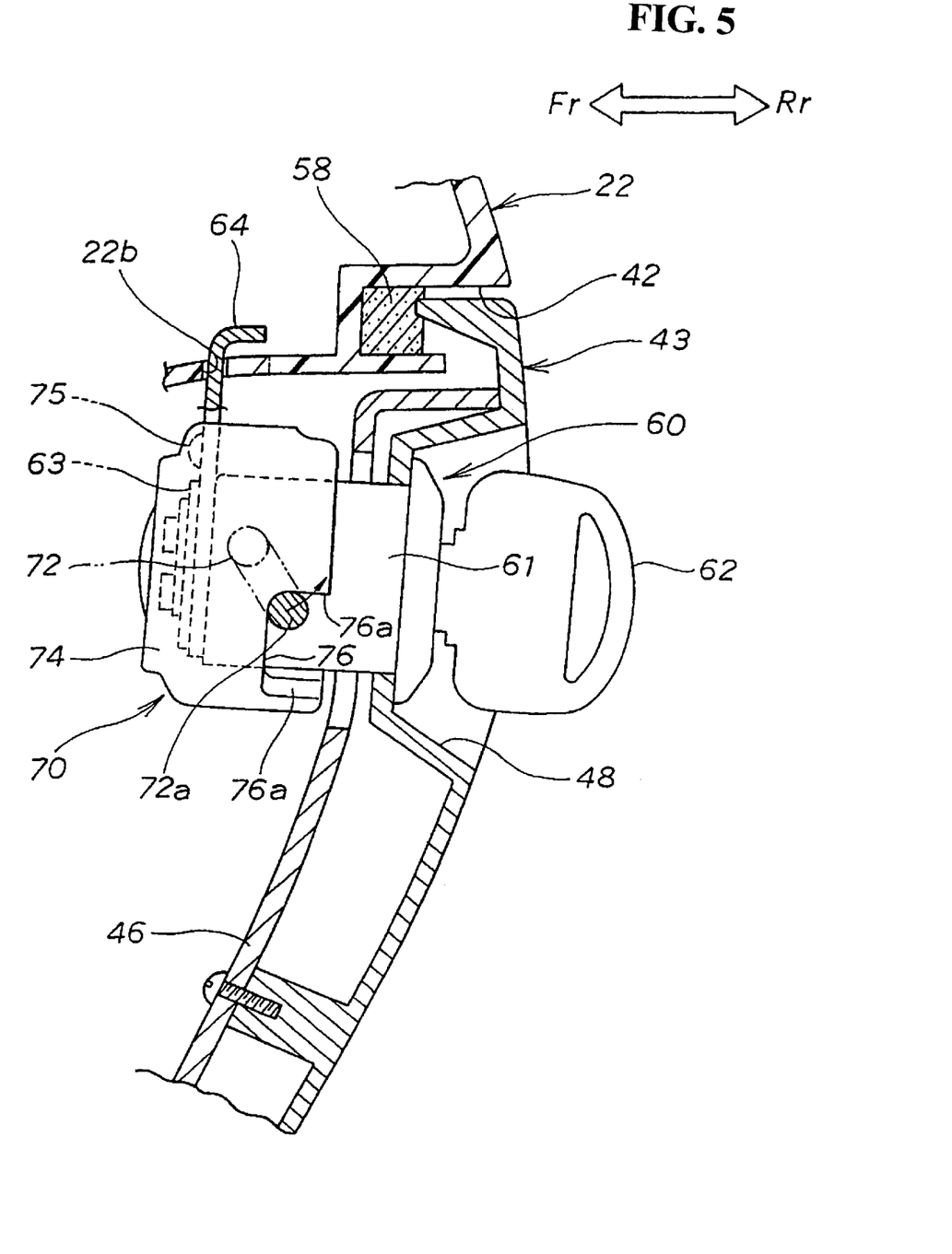
FIG. 5 shows a longitudinal sectional view illustrating around a lid and a lock mechanism according to the present invention.

FIG. 5 shows a longitudinal section view illustrating around a lid and a lock mechanism according to the present invention and illustrates that a lock mechanism mounting recessed section 48 is formed on an upper section of the lid 43 and that the lock mechanism 60 is mounted on this lock mechanism mounting recessed section 48.

The lock mechanism 60 is a well-known cylinder lock conventionally used for locking a lid in an article storing structure of a scooter type vehicle, the mechanism 60 is provided with a key cylinder 61 mounted on the lock mechanism mounting recessed section 48, with a shaft 63 rotated by means of a key 62 inserted into a key hole incorporated in the key cylinder 61, and with a second claw 64 extending in cylinder diametrical direction from a tip section of the shaft 63.

The lock mechanism 60 described above is a mechanism capable of being locked through setting a plurality of tumblers (not illustrated) inside the key cylinder 61 by inserting the key 62 in the key hole, through turning the shaft 63 by turning the inserted key 62, through turning the second claw 64 together with the shaft 63, and through fastening it to a lock hole 22b of the inner cover 22. Accordingly, the lid 43 can be fastened to the inner cover 22 by means of the second claw 64 extended from the key cylinder 61 of the lock mechanism 60.

By the way, the lock mechanisms 60 is characterized in that an interlocking cam 74 of the inter locking mechanism 70 is mounted on the second claw 64 by means of a 75. The interlocking cam 74 is a cam member substantially in a shape of cup provided so as to surround an end section of the lock mechanism 60, and is formed of a cam groove 76 on a circumferential surface. A tip section 72a of an interlocking pin 72 engages the cam groove 76.

Figure 6A:
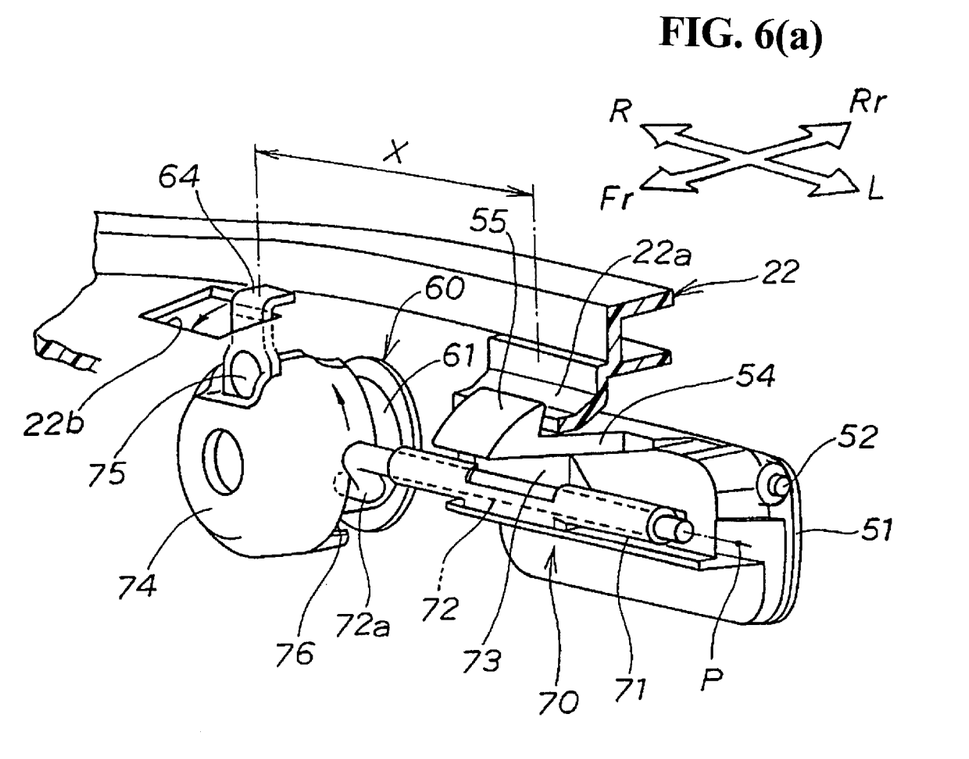
FIGS. 6a and 6b show a perspective view illustrating the relationship of the swing knob, a lock mechanism, and an interlocking mechanism according to the present invention.
Figure 6B:
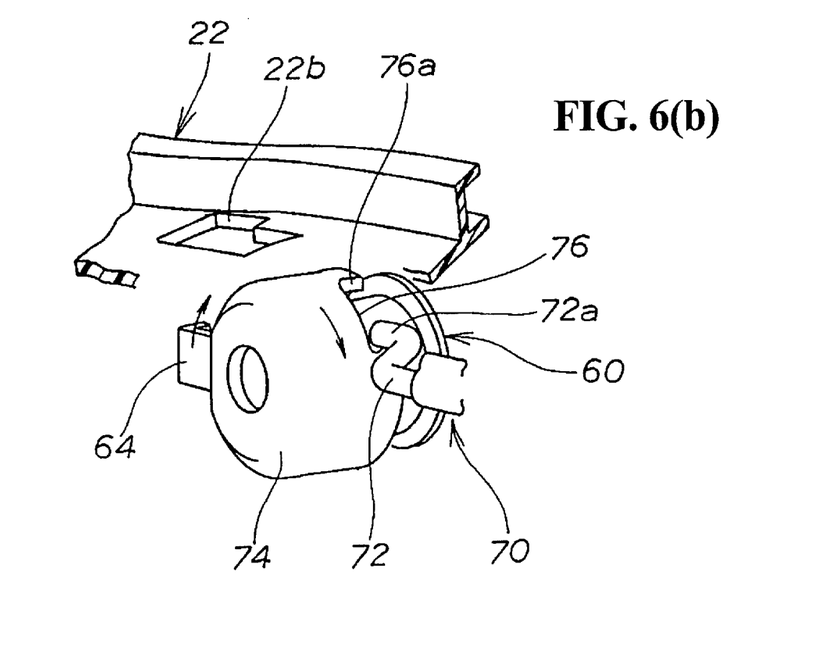

FIGS. 6(a) and (b) show perspective views illustrating a relationship between the swing knob, the lock mechanism, and an interlocking mechanism according to the present invention, and viewed from a forward side of the vehicle body.

FIG. 6(a) illustrates a locked state by providing the second claw 64 of the lock mechanism 60 at a position remote to the right or left from the first claw 54 of the swing knob 51 by the prescribed distance X, and by hooking the second claw 64 to the lock hole 22b for fastening. FIG. 6(b) illustrates an unlatched state by disengaging the second claw 64 from the lock hole 22b.

The tip section 72a of the inter locking pin 72 is the section off-centered from the rotary center P supported on a pin supporting section 71 by a prescribed distance. Accordingly, when the interlocking cam 74 together with the second claw 64 are rotated, the cam groove 76 rotates the tip section 72a of the interlocking pin 72 and thus the interlocking pin 72 is rotated. In the mean time, the interlocking pin 72 may well be elastically biased by means of a return spring in a direction pushing a lower surface of the first claw 54 by means of a lock cam 73 illustrated in FIG. 6(a).

Next, an operation of an article storing structure of the constitution described above will be explained with reference to FIGS. 6(a), 6(b) and 7(a) to 7(d).

FIGS. 7(a) to (d) are views illustrating an operation of an article storing structure according to the present invention.

Figure 7A:
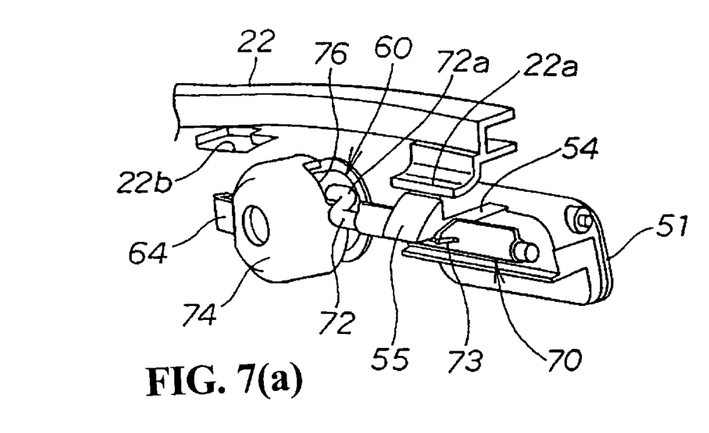
FIGS. 7a–7b show a view illustrating an operation of an article storing structure according to the present invention.
Figure 7B:
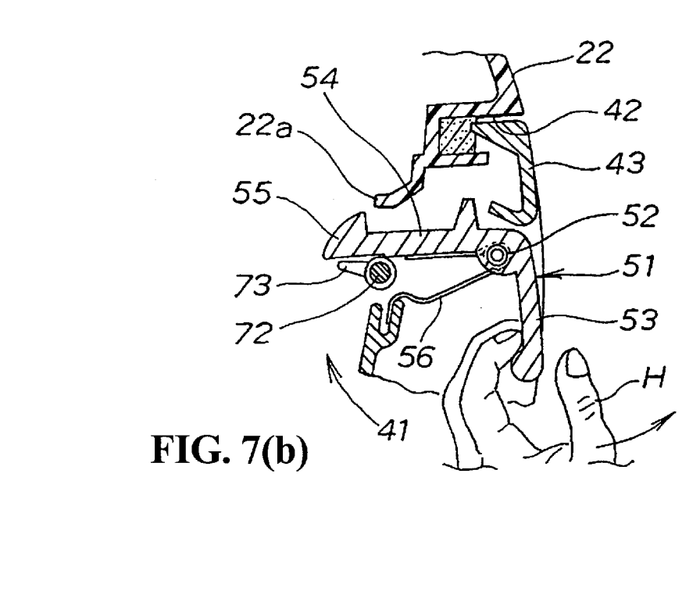

FIG. 7(a) and FIG. 7(b) illustrate states pulling a finger hooking section 53 of the swing knob 51 to this side by a hand H for positioning the lock mechanism 60 in an unlatched state. At this moment, the lock cam 73 is tumbled, and the locking projection section 55 of the first claw 54 is disengaged from the locking piece 22a. The lid 43 can be opened by pulling the finger hooking section 53 by the hand H.

On the other hand, in a state of FIG. 7(b), when the hand H is disengaged from the finger hooking section 53, the swing knob 51 swings clockwise in FIG. 7(b) due to elastic biasing force of the return spring 56. As a result, the locking projection section 55 is fastened to the locking piece 22a.

Next, as illustrated in FIG. 6(b), the second claw 64 is rotated clockwise in FIG. 6(b), the interlocking cam 74 is also rotated in the same direction by rotating the key after inserting it into the keyhole of the lock mechanism 60. When the interlocking cam 74 is rotated, an edge section 76a of the cam groove 76 pushes the tip section 72a of the interlocking pin 72 and is made swing the pin 72. As a result, the cam 74, the claws 54 and 64 are positioned in the state as illustrated in FIG. 7(c) and FIG. 7(d).

Figure 7C:
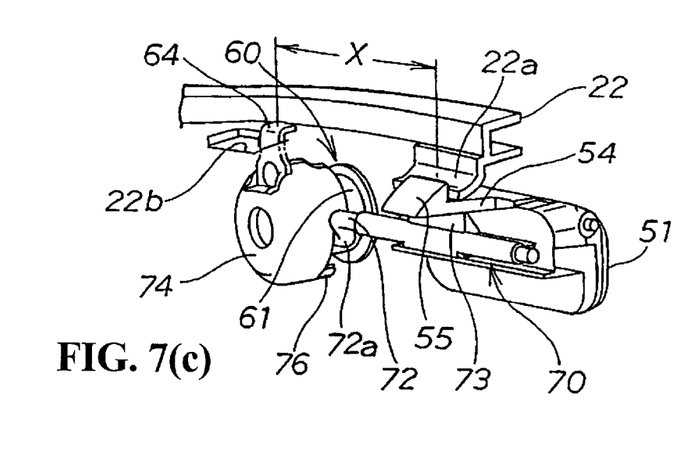
Figure 7D:
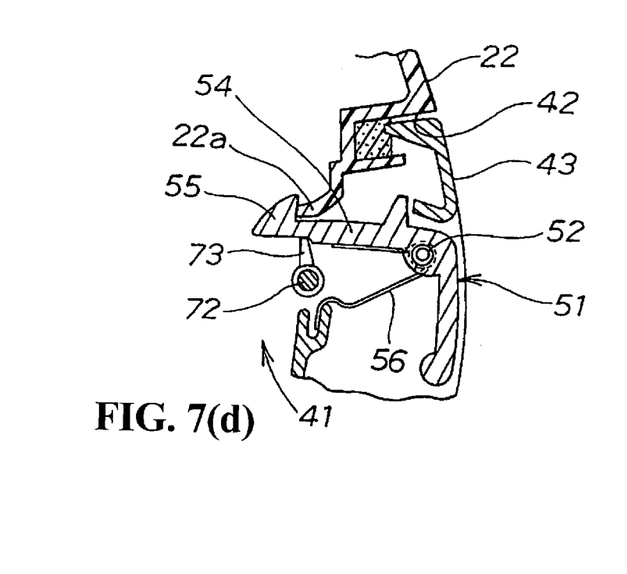

FIG. 7(c) and FIG. 7(d) illustrate the lid 43 fastened to the inner cover 22 by pushing the first claw 54 upwardly and fastening it to the locking piece 22a by means of the lock cam 73. The lid 43 is fastened to the inner cover 22 by fastening the second claw 64 to the lock hole 22b.

The present invention, as stated above, includes the lid 43 fastened to the inner cover 22 by means of the first claw 54 and the first claw is locked by means of the lock mechanism 60. The lid 43 is fastened to the inner cover 22 also by means of the second claw 64 of the lock mechanism 60 and the second claw is also locked by means of the lock mechanism 60. That is, the lid 43 is locked by means of two pieces of claws with the first claw 54 and the second claw 64 positioned remote from the first claw 54 by the prescribed distance X.

Accordingly, only one piece of the lock mechanism 60 is key operated, two positions to the left and right of the lid 43 can simultaneously be locked or unlatched. Therefore, even if a lid having large size or a lid in a shape of a flat plate, the lid 43 can surely be locked or unlatched in the simple operation by means of one piece of a lock mechanism 60.

Further, since a lid is locked by means of the first claw 54 and the second claw 64 reside in positions remote from each other, the edge of the lid 43 can be accurately conformed relative to the edge of the opening 42 in the article storing chamber 41. Accordingly, the external appearance of a scooter type vehicle is enhanced. In addition, there is no necessity to increase the rigidity of the lid 43 such as in a case where the lid 43 having large size or the lid 43 in a shape of flat plate is locked by only one piece of a claw, so that the storing chamber is capable of being accurately locked.

In the mean time, in the embodiment of the present invention described above, the article storing chamber 41 may well be the chamber provided in the vehicle body cover 20, and is not limited to the constitution being provided in the inner cover 22.

Further, the distance X from the first claw 54 to the lock mechanism 60 may well be set appropriately by taking into consideration a shape, dimension, and the rigidity of the lid 43.

The present invention exhibits the following effects by the constitution described above.

In the first aspect, an opening of an article storing chamber provided at a vehicle body cover is covered with an openable/closable lid, the lid is fastened to the vehicle body cover by means of a swingable first claw, the first claw is locked by a lock mechanism, and the first claw is capable of being unlatched by means of a manually operable swing knob provided with the first claw, wherein the lock mechanism is provided at a position remote from the first claw, since the lid can be fastened to the vehicle body cover even by means of the second claw extending from a key cylinder of the lock mechanism, only through a key operation of one piece of lock mechanism. Thus, two locations of the lid are capable of simultaneously being locked or unlatched. Thereby, even if the lid having large size or the lid in a shape of flat plate, the lid can be surely locked or unlatched by a simple operation by means of one piece of the lock mechanism.

In addition, since the lid is locked by the first claw and the second claw reside at positions remote from each other, an edge of the lid can be accurately conformed to an edge of the opening in the article storing chamber. Accordingly, an external appearance property of a scooter type vehicle is greatly enhanced. Besides, the constitution enables the lid to be accurately locked without increasing the rigidity of the lid as in a case where the lid having a large size or the lid in a shape of flat shape is locked by means of only one piece of claw.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An article storing structure for a vehicle comprising:
a vehicle body cover;
an article storing chamber provided in the vehicle body cover;
a lid for covering an opening in the article storing chamber, said lid being an openable/closable lid and being secured in a closed position relative to the vehicle body cover by a swingable first claw;
a lock mechanism for locking the first claw; and
a manually operable swing knob operatively connected to the first claw for unlatching the first claw to permit said lid to be opened;
said lock mechanism is positioned displaced relative to said first claw and said lid is secured to a vehicle body cover by a second claw extending from a key cylinder of said lock mechanism.

2. The article storing structure for a vehicle according to claim 1, wherein said first claw includes a first end secured to said swing knob and a distal end projecting outwardly therefrom, a locking projection is mounted on the distal end of said first claw for engaging a locking piece of said vehicle body for securing said cover in a closed position.

3. The article storing structure for a vehicle according to claim 2, and further including biasing means for biasing the first claw to a first position wherein said locking projection normally engages said locking piece of said vehicle body.

4. The article storing structure for a vehicle according to claim 3, wherein said biasing means is a spring.

5. The article storing structure for a vehicle according to claim 1, wherein said locking mechanism includes an interlocking pin operatively mounted between said locking mechanism and said first claw, said interlocking pin being movable to a first position for enabling said first claw to open said lid and being movable to a second. position for locking said first claw to prevent the opening of said lid.

6. The article storing structure for a vehicle according to claim 5, and further including an interlocking cam including a cam groove mounted for rotation together with said lock mechanism and wherein said interlocking pin includes a tip section positioned adjacent to said cam groove for imparting rotary motion to said interlocking pin when said lock mechanism rotates said cam groove.

7. The article storing structure for a vehicle according to claim 6, and further including a lock cam mounted on said interlocking pin, said lock cam being in engagement with said first claw when said interlocking pin is moved to said second position for locking said first claw to prevent the opening of said lid.

8. The article storing structure for a vehicle according to claim 7, wherein said second claw is secured to said interlocking cam and is moved to a locking position to provide a second member for securing the lid relative to the vehicle body when said lock mechanism is rotated.

9. The article storing structure for a vehicle according to claim 5, and further including a pin support section for rotatably mounting said interlocking pin relative to said lid.

10. The article storing structure for a vehicle according to claim 9, wherein said swing knob includes a support pin for rotatably mounting said swing knob relative to said lid and said pin support section being displaced a predetermined distance relative to said support pin.

11. An article storing structure for a vehicle comprising:
an article storing chamber including an opening for access to said storing chamber;
a lid for covering said opening in the article storing chamber, said lid being normally secured in a closed position relative to the article storing chamber by a swingable first claw;
a lock mechanism for locking the first claw; and
a manually operable swing knob operatively connected to the first claw for unlatching the first claw to permit said lid to be opened;

said lock mechanism is positioned displaced relative to said first claw and said lid is secured to said article storing chamber by a second claw extending from a key cylinder of said lock mechanism.

12. The article storing structure for a vehicle according to claim 11, wherein said first claw includes a first end secured to said swing knob and a distal end projecting outwardly therefrom, a locking projection is mounted on the distal end of said first claw for engaging a locking piece of said article storing chamber for securing said cover in a closed position.

13. The article storing structure for a vehicle according to claim 12, and further including biasing means for biasing the first claw to a first position wherein said locking projection normally engages said locking piece of said article storing chamber.

14. The article storing structure for a vehicle according to claim 13, wherein said biasing means is a spring.

15. The article storing structure for a vehicle according to claim 11, wherein said locking mechanism includes an interlocking pin operatively mounted between said locking mechanism and said first claw, said interlocking pin being movable to a first position for enabling said first claw to open said lid and being movable to a second position for locking said first claw to prevent the opening of said lid.

16. The article storing structure for a vehicle according to claim 15, and further including an interlocking cam including a cam groove mounted for rotation together with said key cylinder of said lock mechanism and wherein said interlocking pin includes a tip section positioned adjacent to said cam groove for imparting rotary motion to said interlocking pin when said key cylinder of said lock mechanism rotates said cam groove.

17. The article storing structure for a vehicle according to claim 16, and further including a lock cam mounted on said interlocking pin, said lock cam being in engagement with said first claw when said interlocking pin is moved to said second position for locking said first claw to prevent the opening of said lid.

18. The article storing structure for a vehicle according to claim 17, wherein said second claw is secured to said interlocking cam and is moved to a locking position to provide a second member for securing the lid relative to the article storing chamber when said lock mechanism is rotated.

19. The article storing structure for a vehicle according to claim 15, and further including a pin support section for rotatably mounting said interlocking pin relative to said lid.

20. The article storing structure for a vehicle according to claim 19, wherein said swing knob includes a support pin for rotatably mounting said swing knob relative to said lid and said pin support section being displaced a predetermined distance relative to said support pin.

* * * * *